United States Patent [19]

Brockman

[11] Patent Number: 4,706,189

[45] Date of Patent: Nov. 10, 1987

[54] SPECIAL PURPOSE PERIPHERAL CIRCUIT AND METHOD OF CONNECTING THE SAME TO A COMPUTER

[76] Inventor: David M. Brockman, 11648 Military Rd. South, Seattle, Wash. 98168

[21] Appl. No.: 750,730

[22] Filed: Jun. 27, 1985

[51] Int. Cl.[4] .............................................. G06F 3/00
[52] U.S. Cl. .................................................. 364/200
[58] Field of Search ... 364/200 MS File, 900 MS File

[56] References Cited

U.S. PATENT DOCUMENTS 3,970,997 7/1976 Daly et al. ........................... 364/200
4,509,113 4/1985 Heath ................................... 364/200

Primary Examiner—Raulfe B. Zache
Attorney, Agent, or Firm—Ward Brown; Robert W. Beach

[57] ABSTRACT

Time-indicating data which is continuously updated by an add-on clock/calendar circuit is conveyed to a general-purpose microcomputer to set the clock mechanism of the computer which otherwise is updated only when the computer is operated. Such time-indicating data is generated independently of operation of the computer and is conveyed to the computer by way of its internal peripheral interface circuit normally dedicated for transferring data from the computer through an output port of the computer. The clock/calendar circuit is connected in parallel with the internal peripheral interface circuit and normally does not interfere with normal transfer of data from the computer to the printer. Consequently, a continuously updated clock/calendar circuit is made available for use by the computer without using an expansion slot.

6 Claims, 3 Drawing Figures

SPECIAL PURPOSE PERIPHERAL CIRCUIT AND METHOD OF CONNECTING THE SAME TO A COMPUTER

BACKGROUND OF THE INVENTION

1. Field of the Invention

The present invention relates to an add-on peripheral circuit adapted to utilize the normally dedicated parallel output port interface of a general-purpose microcomputer to convey information between the peripheral circuit and the computer without requiring use of an expansion slot of the computer and without interfering with the uses to which the computer interface is normally dedicated.

2. Prior Art

General-purpose microcomputers are commonly provided with substantially dedicated interfaces and corresponding ports for connection of the more common peripherals, such as printers. To customize the system, a standard bus and expansion slots are provided for other special-purpose peripherals. The number of expansion slots may be limited, and in customizing or expanding a system most or all of them may be required for peripherals deemed absolutely necessary by the user, such as additional memory, disk controllers, internal modems, graphics enhancement, networking and so on. Consequently, the desirability of a peripheral must be weighed against the number of expansion slots already used or reserved for future use.

Many general-purpose microcomputers have internal clock/calendar circuits, chips or programs updated only when the computer is turned on. Typically, the operating system calls for the user to enter the time and date each time the operating system program is booted. Continuously updated clock/calendar circuits may be available for automatically setting the time and date but require use of an expansion slot. Although much more convenient than manually entering the time and date each time the operating system program is booted, convenience alone may not justify monopolizing an expansion slot for a continuously updated clock/calendar circuit.

SUMMARY OF THE INVENTION

It is an object of the present invention to provide a special-purpose peripheral in a form connectable to a standard microcomputer other than by use of the output ports and expansion slots of the computer.

In accordance with the foregoing object, it is an object ot provide such a special-purpose peripheral in a form connectable to the computer so as to share a parallel output port interface of the computer.

A further object is to provide such a special-purpose peripheral connectable to such parallel output port interface without interfering with the uses to which the interface is normally dedicated but usable to convey data to the computer which data is generated by the peripheral independently of operation of the computer.

An additional object is to provide such a special-purpose circuit of simple design and construction, inexpensive to manufacture, simple to install and reliable in use.

Another object is to provide a novel method of connecting such a peripheral to a computer.

Still another object is to provide a novel method of transferring data generated by the peripheral to the computer.

In the preferred embodiment of the present invention, the computer has an output port for connection of a printer and an internal peripheral interface circuit controlling the supply of data to the printer. A separate special-purpose peripheral circuit, namely, an external clock circuit, is connected directly to the peripheral interface circuit internally of the computer without normally interfering with the supply of data from the computer to the output port. The special-purpose circuit generates special-purpose data independently of use of the computer, namely, time-indicating data, and the computer can be controlled to receive such special-purpose data by way of the peripheral interface circuit. Such time-indicating data can be read into the computer each time the computer-operating system is booted to set the internal clock of the computer automatically without entering additional information by way of the computer keyboard.

DETAILED DESCRIPTION OF THE PREFERRED EMBODIMENT

The preferred embodiment of the present invention was designed to solve a specific problem of a specific general-purpose microcomputer, namely, the provision of a continuously updated clock/calendar circuit for a Zenith Z-100 TM desktop computer, and associated software, for automatically setting the time and date when the operating system is booted without requiring use of one of the five expansion slots available on such computer. The clock/calendar circuit in accordance with the present invention shares the peripheral interface adapter (PIA) which primarily controls output of data to the printer port.

Figure 1:
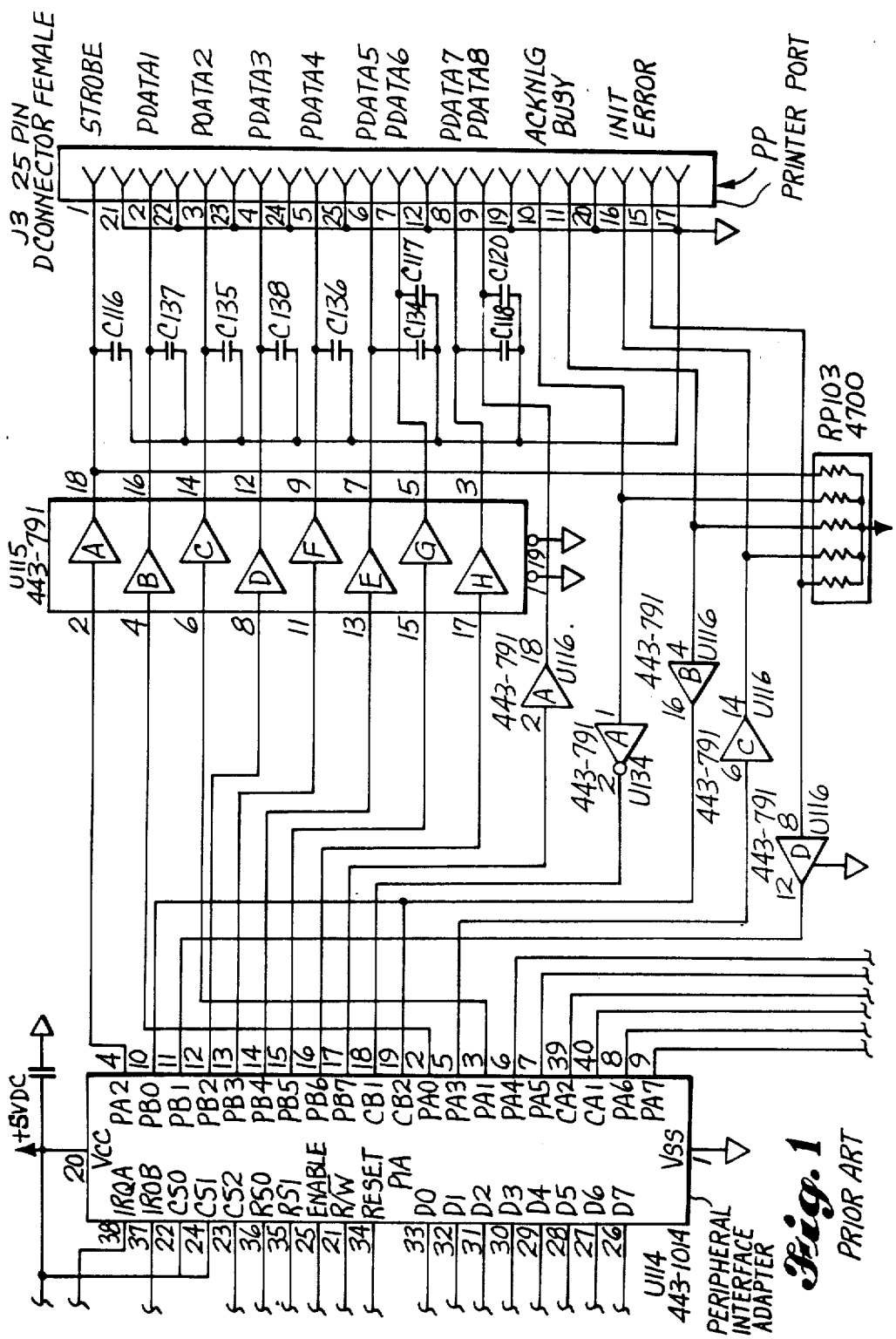
FIG. 1 is a fragmentary, schematic circuit diagram of a portion of the hardware of a known general-purpose microcomputer, namely, the Z-100 TM Series computer marketed in the United States by Zenith Data Systems Corporation of St. Joseph, Mich.

FIG. 1 is an enlarged reproduction of a portion of the main board schematic from the *Desktop Computer Z-100 TM Series Technical Manual* (1983), available from Zenith Data Systems Corporation of St. Joseph, Mich., showing the interconnection of the PIA with the printer port PP. Such manual is hereby expressly incorporated by reference herein. In the Z-100 TM, the PIA is a Motorola MC6821 peripheral interface adapter chip for which the specifications are given beginning at page D.56 of such manual.

As pertinent to operation of a printer connected to the printer port PP, parallel output data is written from the PIA through pins PA0, PA1 and PB2 through PB7. The corresponding pins at the output port are pins PDATA1 through PDATA8.

If the printer is not ready to accept a data byte, a signal is sent to PIA pins PB0 and CB2 by way of the printer port BUSY pin. When the printer has processed a byte and is ready to receive another byte, it sends a signal by way of the printer port ACKNLG pin to PIA pin CB1. A pulse signal is provided at PIA pin PA2 to the STROBE pin of the printer port PP, signaling the printer when a new byte of information from pins PA0, PA1 and PB2 through PB7 (conveyed to port pins PDATA1 through PDATA8) is available.

For printers requiring initialization, the required initializing pulse is supplied at PIA pin PA3 and conveyed to the printer port INIT pin.

The ERROR pin of the printer port, connected to PIA pin PB1, was provided for those few printers that will send a signal indicating a printer failure or required maintenance, such as ribbon changing or paper replenishing. As a practical matter, most programs do not check for such printer "errors" and most printers have other mechanism for indicating them, such as coded beeps.

In summary, as pertinent to operation of a printer through the printer port PP, PIA pins PA0, PA1, PB2 through PB7, PA2 and PA3 are configured by the system software as outputs for transmission of the data bytes and strobe and initializing signals, respectively, and pins CB2 and PB0, CB1 and PB1 are configured as inputs for detecting the printer busy, acknowledge and error signals, respectively.

Figure 2:
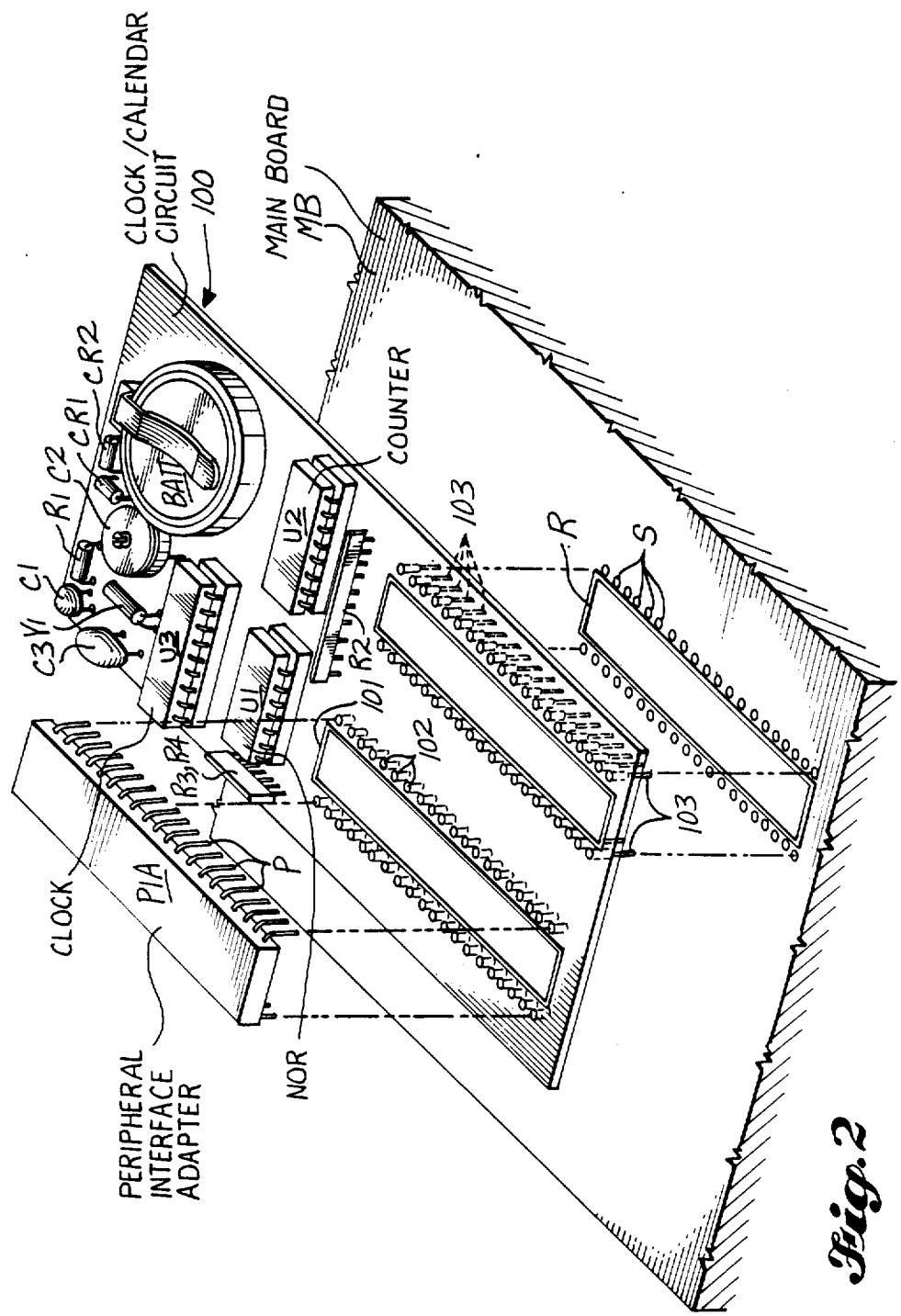
FIG. 2 is a diagrammatic top perspective of a parallel output port peripheral circuit in accordance with the present invention with a component exploded away to illustrate installation of the circuit in the known computer.

FIG. 2 illustrates connection of the special-purpose clock/calendar circuit 100 in accordance with the present invention on the main board MB of the Zenith Z-100 TM computer. The main board has a receptacle R with individual sockets S for the respective pins P of the PIA chip. Such chip is manually unplugged from the main board and installed on the circuit board for circuit 100 in a receptacle 101 having individual sockets 102 for the PIA pins P. Sockets 102 are wired, respectively, to offset plugs or pins 103 projecting downward from the circuit board in alignment with the sockets S of the main board receptacle R. After removal of the PIA from the main board receptacle R and installation in the circuit board receptacle 101, the circuit board itself is installed on the computer main board with pins 103 received in the main board sockets S.

The interconnection of the PIA pins P with the receptacle sockets S before and after installation of the circuit 100 is the same. The computer operates the printer through the printer port as described above, with one important exception. Circuit 100 normally asserts a high voltage at PIA pin PB1 (pin 11) to indicate a "no error" signal from the printer, and the printer is unable to assert a low or logic 0 voltage indicating a printer "error". Consequently, the user must rely on other means to detect a printer error which usually is incorporated in the printer anyway.

Figure 3:
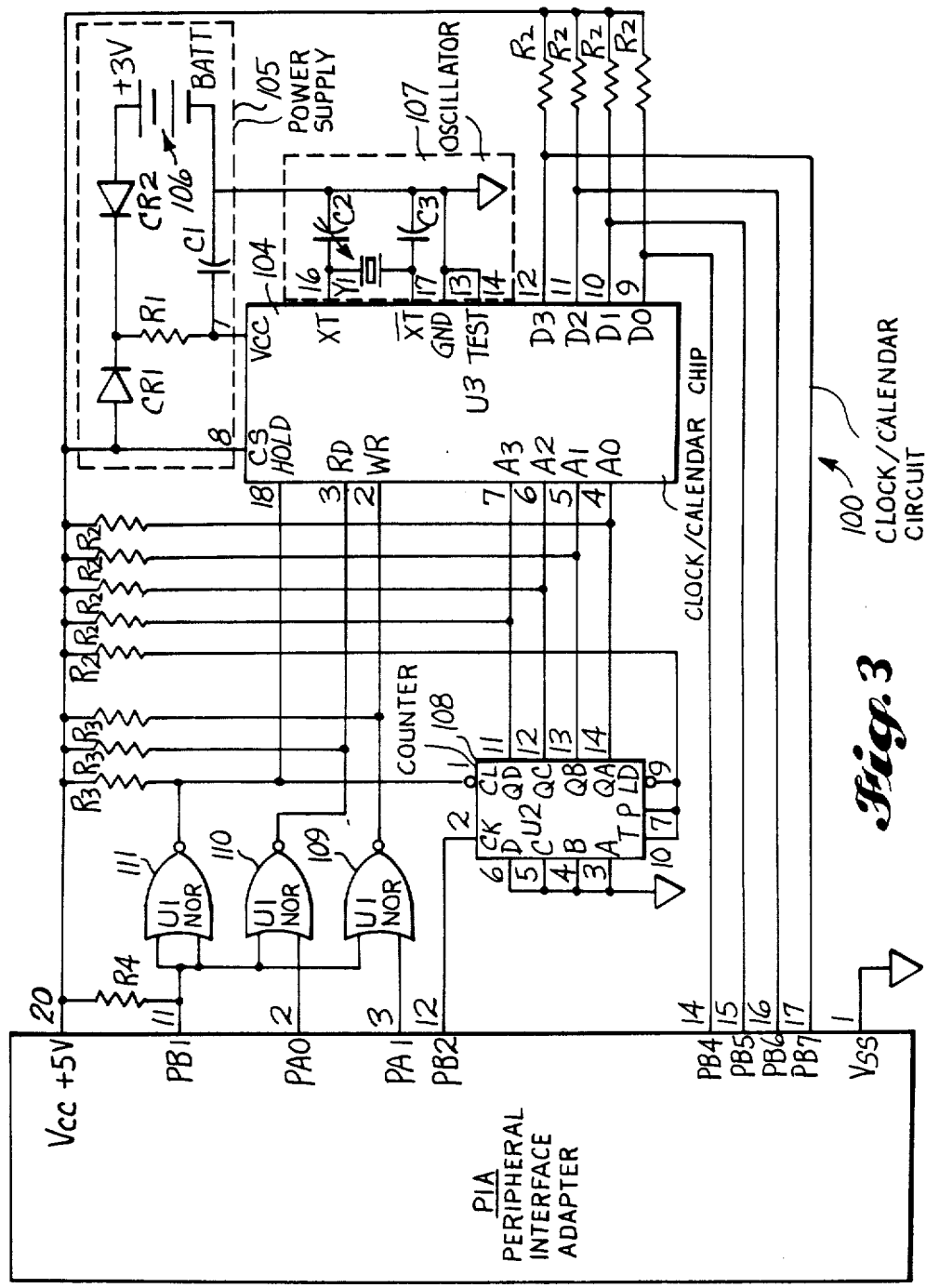
FIG. 3 is a schematic circuit diagram of the circuit shown in FIG. 2.

FIG. 3 shows the diagram for the circuit 100 including the individual PIA pins used in the circuit, namely, the supply voltage pin Vcc, pins PB1, PA0, PA1, PB2 and PB4 through PB7 and the grounded pin Vss. With the exception of pin PB1, normally circuit 100 is not operable to read information from or write information to the PIA chip and, consequently, does not interfere with normal operation of the printer. Under appropriate software control discussed below, circuit 100 controls operation of the PIA for setting the time and date through the computer operating system.

A primary component of circuit 100 is a conventional clock/calendar chip 104 such as the MSM5832 chip marketed by OKI Semiconductor of Santa Clara, Calif. Power to the supply voltage pin Vcc of chip 104 is provided by a conventional power supply subcircuit 105 shown schematically in FIG. 3. During the time that the computer is turned on, power is conveyed to both the chip select (CS) and Vcc pins of the chip by way of the PIA supply voltage pin Vcc (pin 20). During the time that the computer is turned off, power is conveyed to the Vcc pin of chip 104 by a long-life lithium battery 106. The battery backup capacitor C1 eliminates or lessens noise and resistor R1 offers surge protection.

Chip 104 has oscillator inputs XT and /XT ("not XT") for which the oscillator subcircuit 107 including crystal Y1 is incorporated in circuit 100. Variable capacitor C2 allows for frequency adjustment. The oscillating signal provided to pins XT and /XT provides the controlling time-updating signal for the separate registers of chip 104. Such registers keep track of the seconds, minutes, hours, day of the week, date, month and year.

Individual registers of chip 104 are selected by the 4-bit binary code of high and/or low voltages provided to the address input pins A0 through A3. Such pins A0 through A3 are connected, respectively, to output pins QA through QD of a conventional 4-bit counter chip 108. The counter chip is sequenced by high voltage pulses supplied at its clock input pin CK from PIA pin PB2.

Data input to and output from a selected register of chip 104 is through the chip data pins D0 through D3 which are connected, respectively, to PIA pins PB4 through PB7. A high voltage fed to the read pin RD allows binary-coded information from the selected register to be read at pins D0 through D3; and a high voltage fed to the write pin WR causes binary-coded information provided to pins D0 through D3 to be written into the selected register. A high voltage fed to the HOLD pin (pin 18) prevents all registers from being updated by means of the oscillator signal provided at pins XT and /XT, which is used to prevent a change in information occurring while data is being fed from the register to pins D0 through D3.

Pull-up resistors R2 and R3 assure adequate voltage for high voltage signals to be read or written at each of the address, data, read, write and HOLD pins of chip 104. In addition, during normal operation of the computer as discussed above, resistor R4 connected between the PIA Vcc and PB1 pins assures that a high voltage is asserted at pin PB1, indicating a "no error" printer condition. Such high voltage signal also is normally asserted at one input of each of two NOR gates 109 and 110 and both inputs of a third NOR gate 111. The second input of NOR gate 109 is connected to PIA pin PA1, and the second input of NOR gate 110 is connected to PIA pin PA0.

The output of NOR gate 109 is connected to the clock/calendar chip 104 write pin WR; the output of NOR gate 110 is connected to the read pin RD of the clock/calendar chip; and the output of NOR gate 111 is connected to both the HOLD pin of the clock/calendar chip and the reset or clear input pin CL of the counter chip 108. Each NOR gate requires two low inputs in order to provide a high output. Consequently, during normal operation of the computer when at least one high voltage input is fed to each NOR gate through PIA pin Vcc, no enabling signal is provided to the HOLD pin of the clock/calendar chip, no enabling signal is provided to the read or write inputs RD and WR of the clock/calendar chip, and a low voltage is fed to the reset or clear input of the counter chip 110 so that its output at pins QA through QD is held at 0000.

Representative components for the circuit 100 are as follows:

U1: IC, 74LS02 Quad 2-Input NOR gate (3 of which are used)
U2: IC, 74LS161A 4-Bit Binary Counter
U3: IC, MSM5832 Calendar/Clock
R1: Resistor, 100-Ohm ¼ Watt
R2: Resistor Pack, 9 by 10K
R3 and R4: Resistor Pack, 5 by 10K (4 of which are used)
C1: Capacitor, 33 uf 6 V Tantalum
C2: Capacitor, Adjustable 3-26 pf
C3: Capacitor, 22 pf Mica
Y1: Crystal, 32.768 KHz
CR1: Diode, 1N4148 (or equivalent)
CR2: Diode, Low Leakage, HP HSCH-1001
BATT: Battery, Lithium, 3 Volts 150 MAH As noted above, normally the circuit 100 in accordance with the present invention does not interfere with normal operation of the computer. Specifically, such circuit does not interfere with the normal transfer of data to the computer printer port through the PIA. Accessing the circuit 100 can be accomplished, however, by appropriate software which reconfigures pin PB1 of the PIA as an output and asserts a low voltage at such pin. The result is to provide two low inputs to NOR gate 111 so that it feeds a high voltage output to the HOLD pin of the clock/calendar chip 104 and to the reset or clear input CL of the counter chip 108 (which prevents resetting or clearing). The outputs from PIA pins PA0 and PA1 which are conveyed to NOR gates 109 and 110 may or may not be low and, to prevent inadvertently providing a high voltage to the read and/or write pins of the clock/calendar chip, preferably the outputs of pins PA0 and PA1 are first set high so that their corresponding NOR gates 109 and 110 do not provide high voltage outputs.

To set the registers of the clock/calendar chip initially, counter 108 is sequenced by output pulses provided through PIA pin PB2 until a desired register is selected, as controlled by the software. The output voltage at pin PA1 is set low, thereby enabling the clock/calendar chip to write the desired information into the selected register, such information being conveyed to the clock/calendar chip data pins D0 through D3 from PIA output pins PB4 through PB7.

Setting the internal clock circuit or program of the computer or its operating system is accomplished by controlling PIA pins PA0 and PA1 to provide high voltages, thereby preventing inadvertently enabling the clock/calendar chip to read or write information; configuring PIA pin PB1 as an output and pins PB4 through PB7 as inputs; asserting a low voltage at pin PB1, thereby asserting a high voltage at the clock/calendar chip HOLD input and enabling the counter 108 to be sequenced from 0000; sequencing counter 108 by a signal from PIA pin PB2 to select a desired register (or, sequentially, each individual register); and asserting a low output voltage at PIA pin PA0 to actuate the clock/calendar chip to read information from the selected register to its data pins D0 through D3, which information is conveyed to PIA pins PB4 through PB7. Setting of the operating system time and date can be accomplished automatically by an appropriate program run by the AUTOEXEC.BAT file of an operating system sold under the trademark MS-DOS of Microsoft, Inc.

For an MS-DOS operating system, an appropriate program is set forth in Appendix 1. The command ZCLK is added to the AUTOEXEC.BAT file and the TIME and DATE commands are deleted. Each time the operating system is booted, the operating system time and date are set automatically in less than one second. The current time and date are also displayed momentarily on the computer video monitor. During operation of the computer, entering the command ZCLK (space) can be used, whereupon complete instructions appear for setting the registers of the clock/calendar circuit in accordance with the present invention. tv, 10/999

APPENDIX I

```
        TITLE ZCLK ZDOS/MSDOS INTERFACE PROGRAM
        PAGE 44,132
;***********************************************************
; ZCLK.ASM 10/31/84 Revised 11/27/84 12/07/84
;***********************************************************
;** Copyright (c) 1984 FBE Research Company, Incorporated **
;**                    P.O. Box 68234, Seattle, WA  98168  **
;***********************************************************
;** This program is yours.  There is no license agreement. **
;** However, the program is copyrighted and you may not    **
;** sell exact copies of it for profit.  You may modify    **
;** the program and sell the result as long as you include **
;** our copyright notice (above).                          **
;***********************************************************
;   ZCLK for ZDOS or MS-DOS
;
;   INVOKE:   ZCLK
;             ZCLK MM DD YY hh mm
;             ZCLK DST
;
;   Read date and time from ZCLK and set ZDOS/MSDOS date and
```

```
;       time.  If a command line is present, process it.  Skip
;       leading spaces.  If first character is "D," perform Day-
;       light Savings Time command.  Else, assume that the command
;       line contains ten digits in MM DD YY hh mm format and
;       set the date and time.  Any error produces comphrehensive
;       error message.
;
;       The Daylight Savings Time command "springs" forward or
;       "falls" back by adding or subtracting an hour according
;       to the season.  Note that only the hours are affected and
;       the command should not be used at a time where a roll-over
;       or roll-under of the date would occur.
;
;       Access to the ZCLK is via the 6821 Parallel Printer PIA
;       (U114) as follows:
;
;          PIA Bit  Name   Function
;          ----------------------------------------------------
;           PB1     /ERROR  Enable access to ZCLK *
;
;           PA0     PD1     RD Strobe
;           PA1     PD2     WR Strobe
;
;           PB2     PD3     Address Counter Clock
;
;           PB4     PD5     Data Bus Bit D0 (LSB)
;           PB5     PD6     Data Bus Bit D1
;           PB6     PD7     Data Bus Bit D2
;           PB7     PD8     Data Bus Bit D3
;
;       * Installing the ZCLK disconnects PB1 from the /ERROR
;         signal from the printer.  PB1 is programmed as an input
;         by ZDOS/MSDOS but is used here as an output.
;
;**************************************************************
; MSM5832 REGISTER DEFINITIONS
;**************************************************************
;
;                  Data Bus
;       ADDR NAME  D3 D2 D1 D0  RANGE  NOTES
;       ----------------------------------------------------
;         0   S1    *  *  *  *   0-9   S1 and S10 are reset to
;         1   S10      *  *  *   0-5   zero on write to address
;
;         2   MI1   *  *  *  *   0-9
;         3   MI10     *  *  *   0-5
;
;         4   H1    *  *  *  *   0-9
;         5   H10   A  B  *  *   0-2   A=1 for 24 hour format
;                                      A=0 for 12 hour format
;                                      B=1 for PM  B=0 for AM
;
;         6   W        *  *  *   0-6
;
;         7   D1    *  *  *  *   0-9
;         8   D10   C     *  *   0-3   C=0 for 28 day February
;                                      C=1 for 29 day February
;
```

```
;       9       MO1     *   *   *   *   0-9
;       10      MO10                *   0-1
;
;       11      Y1      *   *   *   *   0-9
;       12      Y10     *   *   *   *
;
; All registers are read/write.  * means data valid as "1"
; or "0" bit.  Blank means bit does not exist ("0" during
; read and ignored on write).
;
;****************************************************************
; ASSEMBLY INSTRUCTIONS
;****************************************************************
;
;       MASM ZCLK;
;       LINK ZCLK;
;       EXE2BIN ZCLK.EXE.COM
;       ERASE ZCLK.EXE
;       ERASE ZCLK.OBJ
;
;  Since there is not STACK segment, LINK will generate one
;  error.  Ignore it.
;
;****************************************************************
; DEFINITIONS
;****************************************************************
;
BEL     EQU 7                           ;ASCII CHARACTERS
LF      EQU 10
CR      EQU 13
;
ZPIA    EQU 0E0H                        ;PIA BASE PORT
ADATA   EQU ZPIA+0
ACTL    EQU ZPIA+1
BDATA   EQU ZPIA+2
BCTL    EQU ZPIA+3
;
;****************************************************************
; MAIN LINE
;****************************************************************
;
CSEG    SEGMENT
        ASSUME CS:CSEG, SS:CSEG, DS:CSEG, ES:NOTHING
;
        ORG 100H
ZCLK:   CALL SETTIM                     ;SET CLOCK IF COMMAND LINE
;
        CALL RDCLK                      ;READ THE TIME AND DATE
;
        MOV SI,OFFSET BUFFER
        CALL FMTTIM                     ;MAKE ZDOS/MSDOS TIME FORMAT
;
        MOV AH,2DH                      ;SET TIME
        INT 21H
;
        CMP AL,255                      ;ERROR?
        JNZ TIMOK                       ;BRANCH IF NOT
```

```
;
        MOV DX,OFFSET TEMSG     ;ISSUE ERROR MESSAGE
        CALL TYPTX
;
TIMOK:  INC SI                  ;SKIP DAY OF WEEK
        CALL FMTDAT             ;MAKE ZDOS/MSDOS DATE FORMAT
;
        MOV AH,2BH              ;SET DATE
        INT 21H
        CMP AL,255              ;ERROR?
        JNZ DATOK               ;BRANCH IF NOT
;
        MOV DX,OFFSET DEMSG     ;ISSUE ERROR MESSAGE
        CALL TYPTX
;
DATOK:  CALL SHOTIM             ;SHOW DATE AND TIME
;
        MOV AH,0                ;EXIT TO ZDOS/MSDOS
        INT 21H
;
TEMSG:  DB BEL,CR,LF
        DB 'Could not set the system TIME.'
        DB CR,LF
        DB 'Reset the ZCLK time and date and try again!'
        DB CR,LF
        DB '$'
;
DEMSG:  DB BEL,CR,LF
        DB 'Could not set the system DATE.'
        DB CR,LF
        DB 'Reset the ZCLK Time and Date and try again!'
        DB CR,LF
        DB '$'
;
;****************************************************************
; MAJOR SUBROUTINES
;****************************************************************
; SETTIM -
;   If command line not there, exit.  Else, process the line.
;   If error in line, show error message and exit to system.
;
SETTIM: MOV SI,OFFSET 80H       ;POINT AT COMMAND LINE
        MOV BL,[SI]             ;GET COUNT BYTE
        OR BL,BL                ;SET FLAGS
        JNZ STNEXT              ;SKIP IF NONZERO
;
        RET                     ;ELSE, EXIT
;
STNEXT: INC SI                  ;BUMP POINTER
SKSPLP: MOV AL,[SI]             ;SKIP LEADING SPACES
        CMP AL,' '
        JNZ NOTSPC              ;EXIT IF NON-SPACE
;
        INC SI                  ;BUMP POINTER
        DEC BL                  ;DONE LINE?
        JNZ SKSPLP              ;LOOP IF NOT
```

```
;
        JMP STMERR              ;ELSE IS ERROR
;
NOTSPC: CMP AL,'D'               ;DAYLIGHT SAVINGS TIME COMMAND?
        JZ DODSTX                ;BRANCH IF SO
;
        CMP AL,'d'               ;LOWER CASE?
        JNZ NOTDST               ;BRANCH IF NOT
;
DODSTX: JMP DODST                ;ELSE, PROCESS COMMAND
;
NOTDST: MOV DI,OFFSET DGTBUF     ;SETUP OUTPUT POINTER
        MOV CL,10                ;DIGIT COUNT
SCLOOP: MOV AL,[SI]              ;GET POSSIBLE DIGIT
        INC SI
        CMP AL,'0'               ;LESS THAN ZERO?
        JL NEXT                  ;TRY NEXT IF SO
;
        CMP AL,'9'               ;GREATER THAN NINE?
        JG NEXT                  ;TRY NEXT IF SO
;
        MOV [DI],AL              ;ELSE, BUFFER THE DIGIT
        INC DI
        DEC CL                   ;DONE TEN?
        JZ DODOW                 ;EXIT IF SO
;
NEXT:   DEC BL                   ;DONE ALL OF LINE?
        JNZ SCLOOP               ;LOOP IF NOT
;
STMERR: MOV DX,OFFSET STMMSG     ;SHOW ERROR MESSAGE
        CALL TYPTX
;
        MOV AH,0                 ;EXIT TO SYSTEM
        INT 21H
;
;****************************************************************
; DODOW -
;   Get day of week.
;
DODOW:  MOV DX,OFFSET DWMSG      ;PROMPT THE OPERATOR
        CALL TYPTX
;
        MOV AH,1                 ;GET RESPONSE
        INT 21H
;
        AND AL,00000111B         ;MASK OFF UNUSED BITS
        SUB AL,1
        MOV W,AL                 ;STORE IN BUFFER
;
        JMP DODGTS               ;PROCESS DIGITS
;
DWMSG:  DB CR,LF
        DB 'Specify Day of Week by Number:'
        DB CR,LF
        DB '  1 - Sunday'
        DB CR,LF
        DB '  2 - Monday'
```

```
        DB  CR,LF
        DB  '  3 - Tuesday'
        DB  CR,LF
        DB  '  4 - Wednesday'
        DB  CR,LF
        DB  '  5 - Thursday'
        DB  CR,LF
        DB  '  6 - Friday'
        DB  CR,LF
        DB  '  7 - Saturday'
        DB  CR,LF
        DB  'Type Digit ([1] thru [7]): '
        DB  '$'
;
;*****************************************************************
;
; DODGTS -
;   Process contents of digit buffer and set ZCLK.
;
DODGTS: MOV SI,OFFSET DGTBUF      ;POINT AT DIGITS
;
        MOV DI,OFFSET MO10        ;MONTH
        CALL PUTDG
;
        MOV DI,OFFSET D10         ;DAY
        MOV DL,[SI]
        AND DL,00000011B          ;MASK OFF UNUSED BITS
        CALL PUTDGE
;
        MOV DI,OFFSET Y10         ;YEAR
        CALL PUTDG
;
        MOV DI,OFFSET H10         ;HOURS
        MOV DL,[SI]
        OR DL,00001000B           ;SET 24-HOUR BIT
        CALL PUTDGE
;
        MOV DI,OFFSET MI10        ;MINUTES
        CALL PUTDG
;
        MOV DX,OFFSET STMSG       ;PROMPT OPERATOR
        CALL TYPTX
;
        MOV AH,1                  ;WAIT FOR RESPONSE
        INT 21H
;
        CALL WRCLK                ;SET CLOCK
        MOV DL,LF                 ;CLEAN UP
        JMP TYPEC
;
STMSG:  DB CR,LF,LF
        DB 'Wait for an "even" minute (00 Seconds) '
        DB 'then type [RETURN] to set ZCLK:'
        DB '$'
;
;*****************************************************************
;
; DODST -
;   Process daylight saving time command.  Does not check for
```

; roll over or roll under conditions. Note: Does not mess
; up 24-hour bit in H10.
;
DODST:  CALL RDCLK              ;GET THE ZCLK DATA
;
        MOV SI,OFFSET MO1       ;GET BINARY MONTH
        CALL FIX
;
        MOV SI,OFFSET H1        ;POINT AT HOURS
        CMP AL,7                ;JULY OR LATER
        JGE FALL                ;BRANCH IF SO
;
SPRING: MOV AL,[SI]             ;GET HOURS
        INC SI
        MOV AH,[SI]
        INC AL                  ;ADD ONE
        AAA                     ;CORRECT
        MOV [SI],AH             ;PUT BACK IN BUFFER
        DEC SI
        MOV [SI],AL
        JMP WRHRS               ;ELSE, SET CLOCK
;
FALL:   MOV AL,[SI]             ;GET HOURS
        INC SI
        MOV AH,[SI]
        DEC AL                  ;SUBTRACT ONE
        AAS                     ;CORRECT
        MOV [SI],AH             ;PUT BACK IN BUFFER
        DEC SI
        MOV [SI],AL
        JMP WRHRS               ;UPDATE HOURS ONLY
;
;***************************************************************
; SHOTIM -
;   Output date and time to console.
;
SHOTIM: MOV DX,OFFSET MSG1      ;PREAMBLE
        CALL TYPTX
;
        MOV SI,OFFSET MO10      ;MONTH
        CALL TYDGT
;
        MOV DL,'-'
        CALL TYPEC
;
        MOV SI,OFFSET D10       ;DAY
        CALL TYDGTL
;
        MOV DL,'-'
        CALL TYPEC
;
        MOV SI,OFFSET Y10       ;YEAR
        CALL TYDGT
;
        MOV AL,W                ;DAY OF WEEK
        CALL SHODOW

```
;
        MOV DX,OFFSET MSG2          ;POSTAMBLE
        CALL TYPTX
;
        MOV SI,OFFSET H10           ;HOURS
        CALL TYDGTL
;
        MOV DL,':'
        CALL TYPEC
;
        MOV SI,OFFSET MI10          ;MINUTES
        CALL TYDGT
;
        MOV DL,':'
        CALL TYPEC
;
        MOV SI,OFFSET S10           ;SECONDS
        JMP TYDGT
;
MSG1:   DB CR,LF
        DB 'FBE ZCLK Date '
        DB '$'
;
MSG2:   DB '  Time '
        DB '$'
;
;***************************************************************
; MINOR SUBROUTINES
;***************************************************************
; PUTDG -
;   Store two digits from [SI] at [DI].
;
PUTDG:  MOV DL,[SI]                 ;GET DIGIT
PUTDGE: CALL PUTBYT                 ;PUT DIGIT
        MOV DL,[SI]                 ;GET DIGIT
                                    ;PUT DIGIT
PUTBYT: MOV [DI],DL
        DEC DI                      ;DECREMENT DESTINATION
        INC SI                      ;INCREMENT SOURCE
        RET
;
;***************************************************************
; TYPTX -
;   Output a string at DX to console.
;
TYPTX:  MOV AH,9                    ;ACTIVATE SYSTEM CALL
        INT 21H
        RET
;
;***************************************************************
; TYDGTL and TYDGT -
;   Output two digits pointed at by SI.  TYDGTL masks the MS
;   digit to 3.
;
TYDGTL: MOV DL,[SI]                 ;GET DIGIT
        AND DL,00000011B            ;REMOVE EXTRA BITS
        ADD DL,'0'                  ;MAKE ASCII
        JMP SHORT TYDGTE            ;SNEAK IN
```

```
;
TYDGT:  MOV DL,[SI]                 ;GET DIGIT
TYDGTE: CALL TYPEC                  ;OUTPUT IT

MOV DL,[SI]                 ;GET NEXT DIGIT
TYPEC:  MOV AH,2                    ;OUTPUT VIA SYSTEM
        INT 21H
        DEC SI                      ;MOVE POINTER
        RET
;
;****************************************************************
; SHODOW -
;   Display day of week.  On entry, AL contains day number.
;
SHODOW: MOV BX,OFFSET DOWNDX         ;POINT TO ADDRESS TABLE
        AND AL,00000111B             ;MASK OFF FOR SAFETY
        ADD AL,AL                    ;DOUBLE THE INDEX
        MOV AH,0
        MOV SI,AX                    ;INDEX
        MOV DX,[BX][SI]              ;FETCH ADDRESS
        JMP TYPTX                    ;DISPLAY TEXT
;
DOWNDX: DW OFFSET D0MSG              ;MESSAGE ADDRESS TABLE
        DW OFFSET D1MSG
        DW OFFSET D2MSG
        DW OFFSET D3MSG
        DW OFFSET D4MSG
        DW OFFSET D5MSG
        DW OFFSET D6MSG
        DW OFFSET D7MSG
;
D0MSG:  DB ' Sunday$'                ;MESSAGES
D1MSG:  DB ' Monday$'
D2MSG:  DB ' Tuesday$'
D3MSG:  DB ' Wednesday$'
D4MSG:  DB ' Thursday$'
D5MSG:  DB ' Friday$'
D6MSG:  DB ' Saturday$'
D7MSG:  DB ' ****> NO ZCLK <****$'
;
;****************************************************************
; ACCESS -
;   Access the ZCLK board by taking over the printer PIA.
;   Set RD and WR high.  Make PB1 and OUTPUT and set it low.
;
ACCESS: IN AL,ADATA                  ;SET RD AND WR HIGH
        OR AL,00000011B
        OUT ADATA,AL
;
        CALL SPBDIR                  ;SELECT DIRECTION REGISTER
;
        MOV AL,11111110B             ;MAKE PB1 AND OUTPUT
        OUT BDATA,AL
;
        CALL SPBDAT                  ;SELECT DATA REGISTER
;
        XOR AL,AL                    ;MAKE PB1 LOW TO ENABLE ZCLK
```

```
        OUT BDATA,AL
;
        MOV CX,50               ;WAIT FOR ACCESS (150 USEC)
ACWAIT: LOOP SHORT ACWAIT
        RET
;
;*************************************************************
;
; WRCLK -
;   Write contents of data buffer to ZCLK.
;
WRCLK:  CLI                     ;NO INTERRIPTS
        CALL ACCESS             ;ENABLE THE ZCLK
;
        MOV SI,OFFSET BUFFER    ;SETUP FOR LOOP
        MOV BL,13
OULOOP: MOV AL,[SI]             ;GET BYTE
        CALL WRITE              ;WRITE TO ZCLK
        INC SI                  ;ADVANCE POINTER
        CALL CLKADR             ;ADVANCE ADDRESS COUNTER
        DEC BL                  ;DONE ALL?
        JNZ OULOOP              ;LOOP IF NOT
;
        CALL CLEAR              ;DISABLE THE ZCLK
        STI                     ;INTERRUPTS OK NOW
        RET
;
;*************************************************************
;
; WRITE -
;   Write byte in AL to ZCLK register selected by address
;   counter.
;
WRITE:  MOV CL,4                ;POSITION THE DATA
        ROL AL,CL
        AND AL,11110000B
        OUT BDATA,AL            ;OUTPUT TO ZCLK
;
        IN AL,ADATA             ;SET WR LOW
        AND AL,11111101B
        OUT ADATA,AL
;
        AND AL,AL               ;PAUSE FOR PULSE WIDTH
        AND AL,AL
;
        IN AL,ADATA             ;SET WR HIGH
        OR AL,00000010B
        OUT ADATA,AL
        RET
;
;*************************************************************
;
; WRHRS -
;   Write only Hours register to ZCLK.
;
WRHRS:  CLI                     ;NO INTERRUPTS
        CALL ACCESS             ;ENABLE THE ZCLK
;
        MOV SI,OFFSET H1        ;POINT AT HOURS DATA
        MOV BL,2
```

```
        CALL CLKADR              ;ADVANCE TO HOURS REGISTER
        CALL CLKADR
        CALL CLKADR
        CALL CLKADR
        JMP SHORT OULOOP         ;SNEAK IN
;
;****************************************************************
; RDCLK -
;   Read time and date from ZCLK.
;
RDCLK:  CLI                      ;NO INTERRUPTS
        CALL ACCESS              ;ENABLE THE ZCLK
;
        CALL SPBDIR              ;SELECT DIRECTION REGISTER
;
        MOV AL,00001110B         ;MAKE DB4-DB7 INPUTS
        OUT BDATA,AL
;
        CALL SPBDAT              ;SELECT DATA REGISTER
;
        IN AL,ADATA              ;SET RD LOW
        AND AL,11111110B
        OUT ADATA,AL
;
        MOV DI,OFFSET BUFFER     ;SETUP FOR LOOP
        MOV BL,13
INLOOP: CALL READ                ;READ ZCLK BYTE
        MOV [DI],CL              ;BYTE TO BUFFER
        INC DI                   ;ADVANCE POINTER
        CALL CLKADR              ;ADVANCE ADDRESS COUNTER
        DEC BL                   ;DONE ALL?
        JNZ INLOOP               ;LOOP IF NOT
;
        IN AL,ADATA              ;SET RD HIGH
        OR AL,00000001B
        OUT ADATA,AL
;
        CALL CLEAR               ;DISABLE THE ZCLK
        STI                      ;INTERRUPTS OK NOW
        RET
;
;****************************************************************
; READ -
;   Read data from ZCLK register selected by address counter.
;   Returns ASCII byte in CL.
;
READ:   MOV CX,3                 ;WAIT FOR ACCESS (6 USEC)
RDWAIT: LOOP SHORT RDWAIT
;
        IN AL,BDATA              ;READ ZCLK
        MOV CL,4
        ROR AL,CL                ;POSITION THE DATA
        AND AL,00001111B         ;MASK OFF UNWANTED BITS
        ADD AL,'0'               ;MAKE ASCII
        MOV CL,AL                ;SAVE
        RET
```

```
;***************************************************************
; CLKADR -
;   Advance the address counter.
;
CLKADR: IN  AL,BDATA
        OR  AL,00000100B        ;SET COUNTER CLOCK HIGH
        OUT BDATA,AL
        AND AL,11111011B        ;SET COUNTER CLOCK LOW.
        OUT BDATA,AL
        RET
;
;***************************************************************
; CLEAR -
;   Restore printer PIA to normal.  Deselect ZCLK.
;
CLEAR:  CALL SPBDIR             ;SELECT DIRECTION REGISTER
;
        MOV AL,11111100B        ;MAKE PB1 AN INPUT
        OUT BDATA,AL
;
        JMP SPBDAT              ;SELECT DATA REGISTER
;
;***************************************************************
; SPBDIR -
;   Select Port B Direction Register.
;
SPBDIR: IN  AL,BCTL
        AND AL,11111011B
        OUT BCTL,AL
        RET
;
;***************************************************************
; SPBDAT -
;   Select Port B Data Register.
;
SPBDAT: IN  AL,BCTL
        OR  AL,00000100B
        OUT BCTL,AL
        RET
;
;***************************************************************
; FMTTIM -
;   Transform ZCLK time into ZDOS/MSDOS time.
;
FMTTIM: CALL FIX                ;DO SECONDS
        MOV DH,AL
        MOV DL,AH
;
        CALL FIX                ;DO MINUTES
        MOV CL,AL
;
        CALL FIXL               ;DO HOURS
        MOV CH,AL
        RET
;
```

```
;****************************************************************
; FMTDAT -
;   Transform ZCLK date into ZDOS/MSDOS date.
;
FMTDAT: CALL FIXL                   ;DO DAY
        MOV DL,AL
;
        CALL FIX                    ;DO MONTH
        MOV DH,AL
;
        CALL FIX                    ;DO YEAR
        MOV CL,AL
        MOV CH,AH
        ADD CX,1900
        RET
;
;****************************************************************
; FIXL and FIX -
;   Get two BCD bytes via SI and convert to binary.  FIXL
;   masks MS digit to 3.
;
FIXL:   MOV AL,[SI]                 ;DO HOURS
        INC SI
        MOV AH,[SI]
        AND AH,00000011B            ;MASK OFF UNUSED BITS
        JMP SHORT FIXLE
;
FIX:    MOV AL,[SI]                 ;GET LOW BYTE
        INC SI
        MOV AH,[SI]                 ;GET HIGH BYTE
        AND AH,00001111B            ;MASK OFF UNUSED BITS
FIXLE:  AND AL,00001111B
        INC SI
        AAD                         ;MAKE BINARY
        RET
;
;****************************************************************
; TUTORIAL ERROR MESSAGE -
;
STMMSG: DB 'ZCLK ENTRY ERROR   Software Copyright (c)'
        DB ' 1984 FBE Research Company, Inc.'
        DB CR,LF,LF
        DB 'To set the system Date and Time, type ZCLK[R'
        DB 'ETURN].'
        DB CR,LF,LF
        DB 'To set the ZCLK Date and Time, type ZC'
        DB 'LK MM DD YY hh mm[RETURN].  The Date'
        DB CR,LF
        DB 'and Time must consist of ten digits, t'
        DB 'wo digits each for Month (MM), Date,'
        DB CR,LF
        DB '(DD), Year (YY), Hours (hh), and Minute'
        DB 's (mm).  Use 24-hour format.  That is,'
        DB CR,LF
        DB 'after Noon add 12 hours.  Seconds will'
        DB ' be set to zero so enter the time of'
```

```
        DB    CR,LF
        DB    'the next minute.  The program will sho'
        DB    'w a day-of-week menu.  Type the digit'
        DB    CR,LF
        DB    'from the menu which corresponds to the'
        DB    ' actual current day of the week.  The'
        DB    CR,LF
        DB    'program will then pause and wait for t'
        DB    'he [RETURN] key to be hit before ac-'
        DB    CR,LF
        DB    'ually setting the ZCLK.  This will allow'
        DB    ' the ZCLK seconds to be synchronized'
        DB    CR,LF
        DB    'to an external clock.  As an example, '
        DB    'to set September 4, 1984, at 9:14:20,'
        DB    CR,LF
        DB    'type: ZCLK 09 04 84 09 15[RETURN].  Le'
        DB    'ading zeroes are required.  Non-digits'
        DB    CR,LF
        DB    'are ignored.  Note that 15 was entered'
        DB    ' for "mm" requiring a wait of about 40'
        DB    CR,LF
        DB    'seconds before hitting [RETURN] to cau'
        DB    'se the actual setting of the ZCLK.'
        DB    CR,LF,LF
        DB    'To set Daylight Savings Time, type ZCL'
        DB    'K DST[RETURN].  If the current date is'
        DB    CR,LF
        DB    'before July 1st, one hour will be adde'
        DB    'd to the time.  Otherwise, one hour'
        DB    CR,LF
        DB    'will be subtracted.  The change will n'
        DB    'ot carry over to the Date so use the'
        DB    CR,LF
        DB    '"Spring" command before 2300 hours and'
        DB    ' the "Fall" command after 0100 hours.'
        DB    CR,LF,LF
        DB    '$'
;
;****************************************************************
;
; STORAGE
;
DGTBUF  DB    10 DUP(?)              ;DIGIT BUFFER FOR SETTING
;
BUFFER=THIS BYTE                     ;ZCLK DATA BUFFER
S1      DB    ?                      ;SECONDS
S10     DB    ?
MI1     DB    ?                      ;MINUTES
MI10    DB    ?
H1      DB    ?                      ;HOURS
H10     DB    ?
W       DB    ?                      ;DAY OF WEEK
D1      DB    ?                      ;DATE
D10     DB    ?
MO1     DB    ?                      ;MONTH
MO10    DB    ?
```

```
Y1      DB  ?                              ;YEAR
Y10     DB  ?
;
CSEG    ENDS
;
        END ZCLK
```

I claim:

1. A computer system including a general-purpose computer having an output port and a peripheral connected to the computer by way of the output port, said computer having an internal peripheral interface circuit and means for controlling the peripheral interface circuit to provide data generated by use of the computer to the output port for conveyance to the peripheral, the improvement comprising a special-purpose peripheral circuit connected directly to the peripheral interface circuit internally of the computer without normally interfering with the provision of data from the computer to the output port, said special-purpose circuit having means for generating special-purpose data, and means for enabling said special-purpose data to be conveyed to said computer by way of the peripheral interface circuit.

2. A computer system including a general-purpose computer and a peripheral, such computer having an output port and an internal peripheral interface circuit, and operating system means for controlling operation of the computer and including means for supplying data generated by use of the computer to the output port for conveyance to the peripheral, the improvement comprising a special-purpoe peripheral circuit connected directly to the peripheral interface circuit internally of the computer without normally interfering with the provision of data from the computer to the output port, said special-purpose circuit having means for generating special-purpose data independently of use of the computer, and means for automatically supplying said special-purpose data to the computer by way of the peripheral interface circuit each time the operating system means is booted.

3. A computer system including a generally-purpose computer having an output port and an internal peripheral interface circuit, a printer connected to the output port and software means controlling operation of the computer and including means for controlling the peripheral interface circuit to supply data to the printer through the output port, such system further including an internal clock updated only when the computer is operating and settable by use of the software means, the improvement comprising a peripheral clock circuit continuously updated independently of operation of the computer and including means for generating time-indicating data, means for connecting said clock circuit directly to the peripheral interface circuit internally of the computer without normally interfering with the supply of data from the computer to the output port, and means for controlling the computer and said clock circuit to supply time-indicating data from said clock circuit to the computer by way of the peripheral interface circuit so as to set the internal clock of the computer system.

4. The computer system defined in claim 3, the improvement further comprising the software means including means for automatically conveying time-indicating data from the peripheral clock circuit to the computer by way of the peripheral interface circuit to set the internal clock of the computer system each time the software is booted.

5. The method of conveying special-purpose data to a general-purpose computer, which special-purpose data is generated by a special-purpose peripheral circuit independently of operation of such computer, such computer having an output port for connection of a peripheral, and an internal peripheral interface circuit connected to the computer for conveying data from the computer to the output port for conveyance to the peripheral, which method comprises connecting the special-purpose peripheral circuit directly to the internal peripheral interface circuit in parallel with its connection to the computer without changing the connection of the internal peripheral interface circuit with the computer, normally controlling the computer and the internal peripheral interface circuit to operate so as not to interfere with the conveying of data from the computer to the output port, and intermittently controlling the computer and the peripheral interface circuit to receive the special-purpose data from the special-purpose peripheral circuit.

6. The method of connecting a special-purpose peripheral circuit to a general-purpose computer system, such special-purpose peripheral circuit having mechanism for generating special-purpose data independently of operation of the computer system and such computer system including a computer having an output port for connection of a peripheral and an internal peripheral interface circuit connected to the computer for conveying data generated by the computer to the output port for conveyance to the peripheral, which method comprises first disconnecting the internal peripheral interface circuit from the computer, then connecting the internal peripheral interface circuit to the special-purpose peripheral circuit, then connecting the special-purpose peripheral circuit and the internal peripheral interface circuit to the computer so that the connection of the internal peripheral interface circuit with the computer is the same as before its disconnection from the computer, then normally controlling the computer so as not to interfere with the conveying of data from the computer to the output port by the peripheral interface circuit, and intermittently controlling the computer including the peripheral interface circuit to receive the special-purpose data from the special-purpose peripheral circuit.

* * * * *